(12) United States Patent
Yang et al.

(10) Patent No.: US 11,965,790 B2
(45) Date of Patent: Apr. 23, 2024

(54) SENSOR DIAGNOSTIC METHOD AND SYSTEM FOR PRESSURE TRANSMITTER

(71) Applicant: Honeywell International Inc., Morris Plains, NJ (US)

(72) Inventors: Wang Yang, Cave Creek, AZ (US); Mark L. Muldowney, Chalfont, PA (US)

(*) Notice: Subject to any disclaimer, the term of this patent is extended or adjusted under 35 U.S.C. 154(b) by 46 days.

(21) Appl. No.: 17/353,517

(22) Filed: Jun. 21, 2021

(65) Prior Publication Data

US 2022/0003625 A1 Jan. 6, 2022

Related U.S. Application Data

(60) Provisional application No. 63/048,052, filed on Jul. 3, 2020.

(51) Int. Cl.
*G01L 27/00* (2006.01)
*G01L 1/18* (2006.01)
*G01L 25/00* (2006.01)

(52) U.S. Cl.
CPC .............. *G01L 27/007* (2013.01); *G01L 1/18* (2013.01); *G01L 25/00* (2013.01)

(58) Field of Classification Search
CPC .................................................... G01L 27/007
See application file for complete search history.

(56) References Cited

U.S. PATENT DOCUMENTS

| | | | | |
|---|---|---|---|---|
| 4,414,853 A * | 11/1983 | Bryzek | ................... | G01L 9/065 |
| | | | | 374/173 |
| 6,422,088 B1 * | 7/2002 | Oba | ..................... | G01R 17/10 |
| | | | | 73/754 |
| 6,433,554 B1 * | 8/2002 | Kawate | ................... | G01D 3/08 |
| | | | | 324/705 |
| 6,687,642 B2 * | 2/2004 | Maher | .................. | G01D 3/0365 |
| | | | | 702/127 |
| 6,959,607 B2 * | 11/2005 | Wilda | ................... | G01L 13/025 |
| | | | | 303/122.09 |
| 7,085,657 B2 * | 8/2006 | Drossel | ................... | G01L 9/045 |
| | | | | 702/65 |
| 8,245,562 B2 * | 8/2012 | Dawson | ................ | G01L 27/007 |
| | | | | 73/1.61 |
| 9,054,724 B2 * | 6/2015 | Schaetzle | ............ | H03M 1/1071 |
| 9,322,732 B2 * | 4/2016 | Marrota | ................... | G01L 9/04 |
| 9,470,593 B2 | 10/2016 | Davis et al. | | |

(Continued)

OTHER PUBLICATIONS

Honeywell, Connected Industrial, "Smartline Pressure Transmitters, Modular, Accurate and Robust for the Lowest Cost of Ownership", 2016.

*Primary Examiner* — Tran M. Tran
(74) *Attorney, Agent, or Firm* — Ortiz & Lopez PLLC; Kermit D. Lopez; Luis M. Ortiz

(57) ABSTRACT

Methods and systems for diagnosing a sensor can involve detecting a group of sensor signals output from a sensor, and differentiating from among the sensor signals to distinguish inequalities in the sensor signals for an indication of a potential fault in the sensor. A small sensor signal can be identified from a larger sensor signal among the sensor signals for the indication of the potential fault in the sensor. The sensor can include a group of piezo-resistive Wheatstone bridge elements, and in some embodiments, the sensor may be a pressure transmitter.

16 Claims, 2 Drawing Sheets

(56) References Cited

U.S. PATENT DOCUMENTS

| | | | |
|---|---|---|---|
| 9,568,385 B2* | 2/2017 | Yamada | G01L 9/0042 |
| 9,638,762 B2* | 5/2017 | Scherr | G01R 33/093 |
| 9,652,905 B2* | 5/2017 | Peev | G07C 5/0808 |
| 9,846,204 B2* | 12/2017 | Huber | G01R 33/0082 |
| 9,998,138 B1* | 6/2018 | Wang | H03M 1/1215 |
| 10,337,942 B2 | 7/2019 | Stewart | |
| 10,353,018 B2* | 7/2019 | Scherr | G01R 33/098 |
| 10,416,697 B2 | 9/2019 | Bertin | |
| 10,605,688 B2* | 3/2020 | Oba | G01L 27/007 |
| 10,732,015 B2* | 8/2020 | Jehle | G01L 27/007 |
| 10,830,819 B2* | 11/2020 | Marinov Peev | G01D 18/00 |
| 10,895,600 B2* | 1/2021 | Bilbao De Mendizabal | G01R 33/07 |
| 10,976,184 B2* | 4/2021 | Peev | G01R 33/07 |
| 11,079,295 B2* | 8/2021 | Solazzi | G01L 9/02 |
| 11,079,413 B2* | 8/2021 | Bertin | G01L 1/2262 |
| 11,085,976 B2* | 8/2021 | Bilbao De Mendizabal | G01R 33/0029 |
| 11,209,514 B2* | 12/2021 | Peev | G01R 33/07 |
| 11,275,127 B2* | 3/2022 | Towne | H03M 1/1076 |
| 11,275,129 B2* | 3/2022 | Peev | G01D 21/00 |
| 11,287,455 B2* | 3/2022 | Vergauwen | G01D 3/036 |
| 11,480,631 B2* | 10/2022 | Bilbao de Mendizabal | G01R 33/093 |
| 11,500,020 B2* | 11/2022 | Marinov Peev | G01R 31/318511 |
| 11,630,162 B2* | 4/2023 | Sato | G01R 17/20 324/543 |
| 2005/0038623 A1* | 2/2005 | Hammerschmidt | G01R 31/2829 702/118 |
| 2007/0204688 A1 | 9/2007 | Dmytriw et al. | |
| 2007/0295082 A1 | 12/2007 | Kilian | |
| 2012/0300420 A1 | 11/2012 | Muldowney et al. | |
| 2013/0080084 A1* | 3/2013 | Miller | G01L 27/007 702/50 |
| 2015/0070007 A1* | 3/2015 | Kurniawan | G01R 33/0023 324/251 |
| 2019/0107578 A1* | 4/2019 | Marinov Peev | G01R 33/07 |
| 2021/0018562 A1* | 1/2021 | Marinov Peev | G01R 33/0035 |

\* cited by examiner

300

```
┌─────────────────────────────────────────────────────────┐
│   Detect group of signals output from a sensor          │
│                                                     302 │
└─────────────────────────────────────────────────────────┘
                            │
                            ▼
┌─────────────────────────────────────────────────────────┐
│  Differentiate signals among the group of signals       │
│  output from the sensor                             304 │
└─────────────────────────────────────────────────────────┘
                            │
                            ▼
┌─────────────────────────────────────────────────────────┐
│   Distinguish inequalities among the signals      306   │
└─────────────────────────────────────────────────────────┘
                            │
                            ▼
┌─────────────────────────────────────────────────────────┐
│  Identify the inequalities including small sensor       │
│  signal from larger sensor signal among the sensor      │
│  signals for indication of a fault in the sensor    308 │
└─────────────────────────────────────────────────────────┘
                            │
                            ▼
┌─────────────────────────────────────────────────────────┐
│  Displaying indication of sensor fault in a sensor      │
│  display (e.g., field device display)               310 │
└─────────────────────────────────────────────────────────┘
```

FIG. 3

SENSOR DIAGNOSTIC METHOD AND SYSTEM FOR PRESSURE TRANSMITTER

CROSS-REFERENCE TO PROVISIONAL APPLICATION

This patent application claims priority under 35 U.S.C. § 119(e) to U.S. Provisional Patent Application Ser. No. 63/048,052 entitled "Sensor Diagnostic Method and System for Pressure Transmitter," which was filed on Jul. 3, 2020, the disclosure of which is incorporated herein by reference in its entirety.

TECHNICAL FIELD

Embodiments relate to industrial sensors and field devices. Embodiments further relate to sensor diagnostic methods and systems. Embodiments also relate to pressure transmitters and methods and systems for identifying faults in sensors such as pressure transmitters.

BACKGROUND

In industrial process control at manufacturing plants, sensors for sensing physical measurements for the process being run (e.g., pressure, temperature, level, fluid flow, etc.) and instruments performing control output actions (e.g., control valves, actuators, or drive units) for the processing units in industrial plants may be located across a large geographic area. These instruments are generally referred to as "field devices" or "field instruments" (hereafter "field devices").

Contemporary field devices are generally termed "smart" field devices because they can provide valuable asset data besides the basic sensor or control function for a physical parameter. This asset data can relate to the diagnostic health of the field device and the process/application with which it is involved.

Smart field devices can include sensors such as pressure transmitters, which are widely used in industry, to provide instant pressure and flow rate information in process measurement and control applications. Sensor pressure within a processing environment, for example, can be important for controlling the processing conditions. To meet industrial standards, such as Safety Integrity Level (SIL), transmitters must have diagnostic capabilities to identify and alert users in the event of hardware failures. One critical failure mode that must be detected to ensure proper sensor functioning and safety involves detecting when the sensing element itself develops a fault.

A sensor usually includes one or several measurement elements. In an example, each sensing element in a sensor may be sensitive to differential pressure, static pressure or temperature. While modern sensors are robust, faults may occur where the sensing element becomes shorted, broken or loses electrical connection to the measurement circuitry, etc.

In these situations, the sensing elements may still generate seemingly valid signals as if the transmitter is operating normally. Faults of this nature are considered 'Dangerous' and 'Undetected' and can significantly reduce the SIL score of a given sensor design. It is critically important that these types of faults be quickly detected and identified.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved methods and systems for detecting faults in a sensor.

It is another aspect of the disclosed embodiments to provide for an improved sensor diagnostic method and system.

It is a further aspect of the disclosed embodiments to provide for an improved pressure transmitter.

The aforementioned aspects and other objectives can now be achieved as described herein. In an embodiment, a method for diagnosing a sensor, can involve detecting a plurality of sensor signals output from a sensor, and differentiating from among the plurality of sensor signals to distinguish inequalities in the plurality of sensor signals for an indication of a potential fault in the sensor. Differentiating from among the plurality of sensor signals can further involve identifying a smaller sensor signal from a larger sensor signal among the plurality of sensor signals for the indication of the potential fault in the sensor.

In an embodiment, the sensor may be a pressure transmitter.

In an embodiment, the sensor can comprise a plurality of piezo-resistive Wheatstone bridge elements.

In an embodiment, the plurality of piezo-resistive Wheatstone bridge elements can comprise: a first piezo-resistive Wheatstone bridge element among the plurality of piezo-resistive Wheatstone bridge elements can be most sensitive to a first condition; a second piezo-resistive Wheatstone bridge element among the plurality of piezo-resistive Wheatstone bridge elements can be most sensitive to a second condition; and a third piezo-resistive Wheatstone bridge element among the plurality of piezo-resistive Wheatstone bridge elements can be most sensitive to a third condition.

In an embodiment, each of the first condition, the second condition, and the third condition can comprise one or more of: differential pressure, a static pressure and a temperature.

In an embodiment, each of the plurality of piezo-resistive Wheatstone bridge elements can comprise one or more of, a capacitor-based sensing element, a resonance-based sensing element, and a resistor-based sensing element.

In an embodiment, a system for diagnosing a sensor, can include an analog-to-digital converter that receives a plurality of sensor signals output from a sensor, and a microcontroller that communicates electronically with the analog-to-digital converter and which differentiates from among the plurality of sensor signals to distinguish inequalities in the plurality of sensor signals for an indication of a potential fault in the sensor.

In an embodiment, the microcontroller can further identify a smaller sensor signal from a larger sensor signal among the plurality of sensor signals for the indication of the potential fault in the sensor.

In an embodiment, a system for diagnosing a sensor, can include: at least one processor; and a non-transitory computer-usable medium embodying computer program code, the computer-usable medium capable of communicating with the at least one processor. The computer program code can include instructions executable by the at least one processor and configured for: detecting a plurality of sensor signals output from a sensor; and differentiating from among the plurality of sensor signals to distinguish inequalities in the plurality of sensor signals for an indication of a potential fault in the sensor.

In an embodiment, the instructions for differentiating from among the plurality of sensor signals to distinguish inequalities in the plurality of sensor signals, can further include instructions configured for: identifying a smaller sensor signal from a larger sensor signal among the plurality of sensor signals for the indication of the potential fault in the sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3 illustrates a flow diagram depicting a method for diagnosing a sensor, in accordance with an embodiment.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
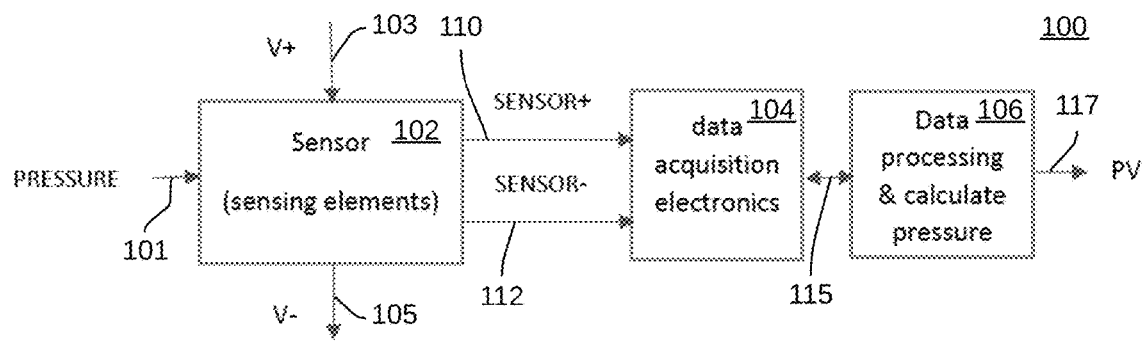
FIG. 1 illustrates a block diagram of a sensor system, in accordance with an embodiment.

FIG. 1 illustrates a block diagram of a sensor system 100, in accordance with an embodiment. The sensor system 100 depicted in FIG. 1 can be implemented in the context of a 'field device' as discussed previously, and can include a sensor 102 comprising a group of sensing elements. The term 'field device' as utilized herein can relate to an apparatus, a device, or a system that can include (i) a sensor (e.g. sensor 102) for measuring at least one of the plurality of physical process parameters (e.g., pressure, temperature of flow) or (ii) an instrument for performing control output actions (e.g., an actuator) for at least one of the processing units.

The sensor 102 can detect a condition such as pressure 101. The sensor 102 shown in FIG. 1 can be subject to a positive voltage 103 (+V) and a negative voltage 105 (−V), and can output a first sensor signal 110 and a second sensor signal 112, which are input to data acquisition electronics 104 that in turn can output a signal 115 that can be electronically input to a module 106 that processes sensor data and calculates PV (Process Variables) indicative of a condition (e.g., pressure). The module 106 may be, for example, a data-processing apparatus, such as, for example, a microprocessor or a microcontroller.

The sensor 102 can be powered by V+ and V− and can react to PRESSURE (see pressure 101) by means of outputs SENSOR+ and SENSOR−. To avoid saturation, the sensor 102 can be powered with elevation so that SENSOR+ and SENSOR− can be in a similar amplitude with respect to the same pressure but in opposite directions. The data acquisition electronics 104 can acquire sensor signals, which can be then fed to the module 106 for data processing and calculate of the process variables (PV), which in this example, can include process variable(s) indicative of pressure.

PV can be a function of SENSOR+ and SENSOR−, as in the following equation:

$$PV = f\{SENSOR+, SENSOR-\}$$

When the sensor 102 is working properly, this equation can function properly. If, however, one or both sensor signals lose connection to the data acquisition electronics 104, or the sensor 102 is short/open, the converted signal may be still in a reasonable response range, which can result in a false but believable PV. The fault can be identified by the following equations, based on a common sensor design structure and physics on power balance. The "~=" sign in EQ1 to EQ4 is meant for close approximation, and may be due to SENSOR+ and SENSOR− variations from sensor to senor. This variance, however, may be small compared to when a sensor issue occurs:

$$(SENSOR+) + (SENSOR-) \sim = Const1 * \langle (V+) - (V-) \rangle \quad \text{EQ1}$$

$$(SENSOR+) \sim = \frac{\langle (V+) - (V-) \rangle}{Const2} + \frac{\Delta}{2} \quad \text{EQ2}$$

-continued $$(SENSOR-) \sim = \frac{\langle (V+)-(V-) \rangle}{Const3} - \frac{\Delta}{2} \qquad \text{EQ3}$$

$$\{(V+)-(V-)\} \sim = Const4 \qquad \text{EQ4}$$

$$\Delta min \leq \Delta \leq \Delta max \qquad \text{EQ5}$$

Where
SENSOR+ is sensor signal main response to positive pressure
SENSOR− is sensor signal main response to negative pressure
V+ is sensor positive power
V− is sensor negative power
$\Delta^\sim$=(SENSOR+−SENSOR−), much smaller than absolute value of SENSOR+ or SENSOR−
Const1 is usually a constant, such as 1
Const2 and Const3 are usually a constant, such as 2
Const4 is the external power voltage by design, such as 2.5V
$\Delta max$ is the maximum value of $\Delta$, based max pressure, it's a fraction of $\{(V+)-(V-)\}$
$\Delta min$ is the minimum value of $\Delta$, based min pressure, I's a fraction of $\{(V+)-(V-)\}$ When the transmitter is functioning properly, the inequalities in EQ1 to EQ3 may be indicate noise as compared to the SENSOR+ and SENSOR− signal; likewise, EQ4 can fluctuate in a range of power supply accuracy and stability. These inequalities may have no impact on the diagnostics. However, if a fault occurs, the inequality (or inequalities) can increase dramatically for easy detection. The following examples illustrate these features:

(1) If both SENSOR+ and SENSOR− are small, for example, due to connection issues or a broken sensor, EQ1, EQ2 and EQ3 may not be established;
(2) If either SENSOR+ or SENSOR− is small, for example, due to connection issues or a sensor short, EQ1 and EQ2 or EQ3 may not be established;
(3) If external power V+ and/or V− have issues, EQ4 will may not be established;
(4) If the left side value of EQ1 is unstable, this can indicate an unstable sensor or data acquisition electronics failures; and
(5) If the left side value of EQ4 is unstable, this can indicate a power supply has an issue or excessive current may have been drawn.

Figure 2:
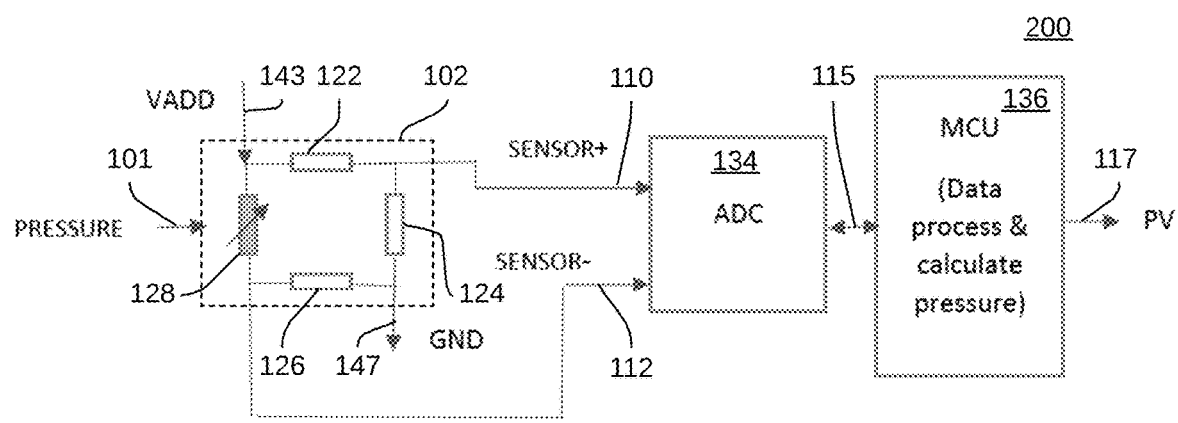
FIG. 2 illustrates a block diagram of a sensor system, in accordance with an alternative embodiment.

FIG. 2 illustrates a block diagram of a sensor system 200, in accordance with an alternative embodiment. Note that in FIG. 1 and FIG. 2, identical or similar parts, elements or components may be identified by identical reference numerals. Thus, the sensor system 200 includes similar components depicted in FIG. 1, such as the sensor 102, etc. The sensor system 200 shown in FIG. 2, however, can include an ADC (Analog to Digital Converter) 134 and an MCU (Microcontroller Unit) 136. The ADC 134 can include data acquisition electronics such as the data acquisition electronics 104 depicted in FIG. 1.

The MCU 136 can implement functionalities of the module 106 shown in FIG. 1 (i.e., processing sensor data and calculating PV). The MCU may be a microcontroller implemented as a compact integrated circuit that can govern one or more specific operations in an embedded system. The MCU may include, for example, a memory, a processor, and input/output (I/O) peripherals on single IC chip. In the example shown in FIG. 2, the sensor 102 may be a pressure transmitter or may form a part of a pressure transmitter.

The sensor 102 shown in FIG. 2 can include a group of piezo-resistive Wheatstone bridge elements including, but not limited to, a first piezo-resistive Wheatstone bridge element 122, a second piezo-resistive Wheatstone bridge element 124, a third piezo-resistive Wheatstone bridge element 126, and a fourth piezo-resistive Wheatstone bridge element 128. The fourth piezo-resistive Wheatstone bridge element 128 may function as a variable component (e.g. a variable resistor). Note that the term 'Wheatstone bridge' as utilized herein can relate to a Wheatstone bridge, which is a type of electrical circuit that can be used to measure an unknown electrical resistance by balancing at least two legs of a bridge circuit, one leg of which can includes the unknown component. Each of the piezo-resistive Wheatstone bridge elements 122, 124, 126, and 128 shown in FIG. 2 may be, for example, a circuit element such as a resistor, a capacitor-based sensing element, a resonance-based sensing element, etc.

The embodiments can be implemented in, for example, the context of a pressure transmitter line for advanced diagnostics and also can be utilized to meet SIL/SIL2 requirements. These diagnostic functions can be implemented in sensor board firmware without changing existing hardware and electronic designs. In some embodiments, three of the piezo-resistive Wheatstone bridge elements 122, 124, 126, and 128 can be used in a pressure sensor. For example, the first piezo-resistive Wheatstone bridge element 122 may be most sensitive to pressure. The second piezo-resistive Wheatstone bridge element 124 may be most sensitive to static pressure, and the third piezo-resistive Wheatstone bridge element 126 may be most sensitive to temperature.

The first piezo-resistive Wheatstone bridge element 122 discussed above can be used to illustrate an example application, but it can be appreciated that the same principal can apply to the other two piezo-resistive Wheatstone bridge elements (i.e., static pressure and temperature). This can be summarized as follows:

V+ is 2.5V sensor positive external power, as VADD
V− is 0V sensor negative external power, as GND
SENSOR+ is measured as single/half bridge input to ADC
SENSOR− is measured as single/half bridge input to ADC
$\Delta$=(sensor+−sensor−), represents SENSOR+ and SENSOR− inputs measured as differential input. Ideally, $\Delta$=(SENSOR+−SENSOR−), but there may be a small difference due to difference in ADC gain and mode
$\Delta max$ is the maximum value of $\Delta$, based on characterization, a fraction of VADD
$\Delta min$ is the minimum value of $\Delta$, based on characterization, a fraction of VADD
PV can thus be calculated with this equation: $=f\{\Delta\}$
For diagnostics, the equations can become as follow:

$$(SENSOR+)+(SENSOR-) \sim = VADD \qquad \text{EQ1}$$

$$(SENSOR+) \sim = \frac{VADD}{2} + \frac{\Delta}{2} \qquad \text{EQ2}$$

$$(SENSOR-) \sim = \frac{VADD}{2} - \frac{\Delta}{2} \qquad \text{EQ3}$$

$$VADD \sim = 2.5 \qquad \text{EQ4}$$

$$\Delta min \leq \Delta \leq \Delta max \qquad \text{EQ5}$$

When the pressure transmitter is functioning properly, the inequalities (since it is a close approximation) in EQ1 to EQ3 may be noise as compared to SENSOR+ and SENSOR− signal; likewise, EQ4 can fluctuate in the range of power supply accuracy and stability. These inequalities may have no impact on the diagnostics. If a fault occurs, however, the inequality can increase drastically, and at least one of the equations may be unable to be established, so the fault may not be detected. This can be illustrated through the following examples:

(1) If both SENSOR+ and SENSOR− lost connection, EQ1 to EQ3 will not be able to establish since SENSOR+ and SENSOR− are both far less than VADD/2 (=2.5V);
For instance:
When a sensor functions well under a pressure and a temperature: SENSOR+=1.25245905, SENSOR−=1.25310183
(SENSOR+)+(SENSOR−)=2.505561~=2.5, EQ1 is established
(SENSOR+)=1.25245905~=1.25, EQ2 is established (SENSOR−)=1.25310183~=1.25, EQ3 is established
Pressure is measured based on {(SENSOR+)−(SENSOR−)}=−0.00064
However, with the same pressure, but a different temperature, loose connection fault occurred:
SENSOR+=0.17549127, SENSOR−=0.16340286
(SENSOR+)+(SENSOR−)=0.338894<<2.5, EQ1 is NOT established
(SENSOR+)=0.175491<<1.25, EQ2 is NOT established
(SENSOR−)=0.163403<<1.25, EQ3 is NOT established
If this fault is not detected, pressure would be measured on a seemingly valid value of {(SENSOR+)−(SENSOR−)}=0.012088, because to this sensor, the valid range may be between −0.00779 and 0.25777;

(2) If either SENSOR+ or SENSOR− is detached, EQ1 and EQ2 or EQ3 may not be able to establish since SENSOR+ or SENSOR−<<VADD/2;
(3) If external power V+ disappears, EQ4 may not be able to establish since VADD measurement <<2.5V;
(4) If sensor is damaged, (EQ2-EQ3) may not agree that EQ5 and/or EQ1 is fault;
(5) If ADC malfunctions, (EQ2-EQ3) may not agree with EQ5, since (ADC output varies too much between single input mode and differential mode);
(6) If pressure is out of a rated range, EQ5 may not be established;
(7) If EQ5 could not be established, but PV is within 2× boundary, this can indicate over pressure conditions;
(8) If EQ5 could not be established, but PV is much beyond the 2× boundary, this may indicate possible sensor damage;
(9) If EQ1 varies above normal range (example, more than 0.01V), would indicate unstable sensor;
(10) If EQ4 varies above normal range, would indicate unstable external power or sensor draws excessive current;
(11) If EQ2 and EQ3 are true, but EQ4 is not established (e.g., much larger than 2.5V), this can indicate a M360 internal measurement malfunction or that a high current situation may have occurred on the sensor board.
(12) . . .

FIG. 3 illustrates a flow diagram depicting a method 300 for diagnosing a sensor, in accordance with an embodiment. The method 300 shown in FIG. 3 can be utilized to diagnose a sensor such as the sensor 102 in both normal and abnormal conditions, which is critical to safety and SIL standards. This method 300 at its core can be used to differentiate a smaller sensor signal from a larger sensor signal as indicated by the equations disclosed previously herein. It is this large difference between the two sensors signals that can render detection possible and reliable.

As shown at block 302, a step or operation can be implemented for detecting a plurality of sensor signals output from the sensor 102. Next, as shown at block 304, a step or operation can be implemented to differentiate sensor signals among the detected plurality of sensor signals. Thereafter, as indicated at block 306, a step or operation can be implemented to distinguish inequalities in the plurality of sensor signals for an indication of a potential fault in the sensor 102. Then, as shown at block 308, a step or operation can be implemented to identify a smaller sensor signal from a larger sensor signal among the plurality of sensor signals for the indication of the potential fault in the sensor 102. Thereafter, as indicated at block 310, a step or operation can be implemented to display the indication of sensor fault in a display (e.g., a field device display or another display such as a display unit located remote from the sensor 102).

Thus, the method 300 of diagnosing a sensor, can involve steps or operations for detecting a plurality of sensor signals output from a sensor, and differentiating from among the plurality of sensor signals to distinguish inequalities in the plurality of sensor signals for an indication of a potential fault in the sensor. The method 300 can further involve a step or operation for identifying a smaller sensor signal from a larger sensor signal among the plurality of sensor signals for the indication of the potential fault in the sensor. Note that the aforementioned step or operation of identifying the smaller sensor signal from the larger sensor signal can be performed as a separate step/operation or as part of the differentiating step/operation. The previously disclosed equations and formulations can also be performed as part of the aforementioned steps/operations of method 300.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer including, for example, a microcontroller as discussed herein. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments of the invention may be implemented entirely in hardware or in an implementation containing both hardware and software elements. In embodiments that do utilize software, the software may include but is not limited to firmware, resident software, microcode, etc.

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, it can be appreciated that a number of embodiments including preferred embodiments and alternative embodiments, are disclosed herein. For example, in an embodiment a method for diagnosing a sensor can involve: detecting a plurality of sensor signals output from a sensor; and differentiating from among the plurality of sensor signals to distinguish inequalities in the plurality of sensor signals for an indication of a potential fault in the sensor.

In an embodiment, differentiating from among the plurality of sensor signals to distinguish inequalities in the plurality of sensor signals, can further involve: identifying a smaller sensor signal from a larger sensor signal among the plurality of sensor signals for the indication of the potential fault in the sensor.

In an embodiment, the sensor may be a pressure transmitter.

In an embodiment, the sensor may include a plurality of piezo-resistive Wheatstone bridge elements.

In an embodiment, the plurality of piezo-resistive Wheatstone bridge elements, can comprise: a first piezo-resistive Wheatstone bridge element among the plurality of piezo-resistive Wheatstone bridge elements is most sensitive to a first condition; a second piezo-resistive Wheatstone bridge element among the plurality of piezo-resistive Wheatstone bridge elements is most sensitive to a second condition; and a third piezo-resistive Wheatstone bridge element among the plurality of piezo-resistive Wheatstone bridge elements is most sensitive to a third condition.

In an embodiment, each of the first condition, the second condition, and the third condition can comprise one or more of: a differential pressure, a static pressure and a temperature.

In an embodiment, each of the plurality of piezo-resistive Wheatstone bridge elements can comprise one or more of: a capacitor-based sensing element, a resonance-based sensing element, and a resistor-based sensing element.

In an embodiment, a system for diagnosing a sensor, can include: an analog-to-digital converter that receives a plurality of sensor signals output from a sensor, and a microcontroller that can communicate electronically with the analog-to-digital converter and which can differentiate from among the plurality of sensor signals to distinguish inequalities in the plurality of sensor signals for an indication of a potential fault in the sensor.

In an embodiment, the microcontroller can further identify a smaller sensor signal from a larger sensor signal among the plurality of sensor signals for the indication of the potential fault in the sensor.

In an embodiment, a system for diagnosing a sensor, can include at least one processor, and a non-transitory computer-usable medium embodying computer program code, the computer-usable medium capable of communicating with the at least one processor. The computer program code can include instructions executable by the at least one processor and configured for: detecting a plurality of sensor signals output from a sensor, and differentiating from among the plurality of sensor signals to distinguish inequalities in the plurality of sensor signals for an indication of a potential fault in the sensor.

In an embodiment, the aforementioned instructions for differentiating from among the plurality of sensor signals to distinguish inequalities in the plurality of sensor signals, can further include instructions configured for: identifying a smaller sensor signal from a larger sensor signal among the plurality of sensor signals for the indication of the potential fault in the sensor.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for diagnosing a sensor, comprising:
subjecting the sensor to a positive voltage and a negative voltage, wherein the sensor comprises a circuit comprising a plurality of Wheatstone bridge circuit elements and is powered by the positive voltage and the negative voltage and reacts to at least one condition by a first sensor signal and a second sensor signal, the at least one condition comprising at least one of a first condition, a second condition or a third condition among a plurality of conditions, wherein a first Wheatstone bridge element among the plurality of Wheatstone bridge elements is most sensitive to the first condition, a second Wheatstone bridge element among the plurality of Wheatstone bridge elements is most sensitive to the second condition; and a third Wheatstone bridge element among the plurality of Wheatstone bridge elements is most sensitive to the third condition;
powering the sensor with elevation to avoid a saturation, wherein the first sensor signal and the second sensor signal provide a corresponding amplitude with respect to the at least one condition;
outputting a plurality of sensor signals from the sensor, the plurality of sensor signals including at least the first sensor signal and the second sensor signal;
detecting the plurality of sensor signals output from the sensor;
differentiating from among the plurality of sensor signals to distinguish inequalities in the plurality of sensor signals for an indication of a potential fault in the sensor;
wherein the step of differentiating further comprises:
identifying a smaller sensor signal with respect to a larger sensor signal among the first sensor signal or the second sensor signal of the plurality of sensor signals for the indication of the potential fault in the sensor; and
differentiating the smaller sensor signal from the larger sensor signal to indicate a large difference between the plurality of sensor signals to render detection of the potential fault in the sensor.

2. The method of claim 1 wherein the sensor comprises a pressure transmitter.

3. The method of claim 1 wherein each of the plurality of Wheatstone bridge circuit elements comprises a piezo-resistive Wheatstone bridge elements.

4. The method of claim 3 wherein the sensor comprises a field device.

5. The method of claim 3 wherein the each of the plurality of Wheatstone bridge circuit elements comprise at least one of:
- a capacitor-based sensing element;
- a resonance-based sensing element; and
- a resistor-based sensing element.

6. The method of claim 1 wherein each of the first condition, the second condition, and the third condition comprise at least one of: a differential pressure, a static pressure and a temperature.

7. A system for diagnosing a sensor, comprising:
- a positive voltage and a negative voltage, wherein the sensor comprises a circuit comprising a plurality of Wheatstone bridge circuit elements and is powered by the positive voltage and the negative voltage and reacts to at least one condition by a first sensor signal and a second sensor signal, wherein the sensor is powered with elevation to avoid a saturation, wherein the first sensor signal and the second sensor signal provide a corresponding an amplitude with respect to the at least one condition, and wherein a plurality of sensor signals is output from the sensor, the plurality of sensor signals including at least the first sensor signal and the second sensor signal, the at least one condition comprising at least one of a first condition, a second condition or a third condition among a plurality of conditions, wherein a first Wheatstone bridge element among the plurality of Wheatstone bridge elements is most sensitive to the first condition, a second Wheatstone bridge element among the plurality of Wheatstone bridge elements is most sensitive to the second condition; and a third Wheatstone bridge element among the plurality of Wheatstone bridge elements is most sensitive to the third condition;
- an analog-to-digital converter that receives the plurality of sensor signals output from the sensor;
- a microcontroller that communicates electronically with the analog-to-digital converter and which differentiates from among the plurality of sensor signals to distinguish inequalities in the plurality of sensor signals for an indication of a potential fault in the sensor;
- wherein the microcontroller is configured to:
  - identify a smaller sensor signal with respect to a larger sensor signal among the first sensor signal or the second sensor signal of the plurality of sensor signals for the indication of the potential fault in the sensor; and
  - differentiate the smaller sensor signal from the larger sensor signal to indicate a large difference between the plurality of sensor signals to render detection of the potential fault in the sensor.

8. The system of claim 7 wherein the sensor comprises a pressure transmitter.

9. The system of claim 7 wherein each of the plurality of Wheatstone bridge circuit elements comprises a piezo-resistive Wheatstone bridge elements.

10. The system of claim 9 wherein the sensor comprises a field device.

11. The system of claim 10 wherein each of the first condition, the second condition, and the third condition comprise at least one of: a differential pressure, a static pressure and a temperature.

12. The system of claim 10 wherein the each of the plurality of Wheatstone bridge circuit elements comprise at least one of:
- a capacitor-based sensing element;
- a resonance-based sensing element; and
- a resistor-based sensing element.

13. A system for diagnosing a sensor, comprising:
- at least one processor; and
- a non-transitory computer-usable medium embodying computer program code, the computer-usable medium capable of communicating with the at least one processor, the computer program code comprising instructions executable by the at least one processor and configured for:
  - subjecting the sensor to a positive voltage and a negative voltage, wherein the sensor comprises a circuit comprising a plurality of Wheatstone bridge circuit elements and is powered by the positive voltage and the negative voltage and reacts to at least one condition by a first sensor signal and a second sensor signal, the at least one condition comprising at least one of a first condition, a second condition or a third condition among a plurality of conditions, wherein a first Wheatstone bridge element among the plurality of Wheatstone bridge elements is most sensitive to the first condition, a second Wheatstone bridge element among the plurality of Wheatstone bridge elements is most sensitive to the second condition; and a third Wheatstone bridge element among the plurality of Wheatstone bridge elements is most sensitive to the third condition;
  - powering the sensor with elevation to avoid a saturation such that the first sensor signal and the second sensor signal provide a corresponding amplitude with respect to the at least one condition;
  - outputting a plurality of sensor signals from the sensor, the plurality of sensor signals including at least the first sensor signal and the second sensor signal;
  - detecting the plurality of sensor signals output from the sensor;
  - differentiating from among the plurality of sensor signals to distinguish inequalities in the plurality of sensor signals for an indication of a potential fault in the sensor;
  - wherein the step of differentiating further comprises:
    - identifying a smaller sensor signal with respect to a larger sensor signal among the first sensor signal or the second sensor signal of the plurality of sensor signals for the indication of the potential fault in the sensor; and
    - differentiating the smaller sensor signal from the larger sensor signal to indicate a large difference between the plurality of sensor signals to render detection of the potential fault in the sensor.

14. The system of claim 13 wherein each of the plurality of Wheatstone bridge circuit elements comprises a piezo-resistive Wheatstone bridge elements.

15. The system of claim 14 wherein the sensor comprises a field device.

16. The system of claim 14 wherein:
- each of the first condition, the second condition, and the third condition comprise at least one of: a differential pressure, a static pressure and a temperature; and the each of the plurality of Wheatstone bridge circuit elements comprises at least one of: a capacitor-based sensing element, a resonance-based sensing element, and a resistor-based sensing element.

* * * * *